United States Patent [19]

Hotta et al.

[11] Patent Number: 4,735,879
[45] Date of Patent: Apr. 5, 1988

[54] RECORDING MEDIA AND RECORDING METHODS

[75] Inventors: Shu Hotta, Hirakata; Mamoru Soga, Osaka; Wataru Shimotsuma, Ibaraki, all of Japan

[73] Assignee: Matsushita Electrical Industrial Co., Ltd., Osaka, Japan

[21] Appl. No.: 726,387

[22] Filed: Apr. 23, 1985

[30] Foreign Application Priority Data

Apr. 23, 1984 [JP] Japan ................................ 59-81310

[51] Int. Cl.⁴ ..................... G03C 11/00; G01D 15/10
[52] U.S. Cl. ........................................ 430/19; 430/21; 430/945; 430/270; 430/271; 430/494; 346/76 R; 346/76 PH; 346/76 L; 346/135.1; 369/76 R
[58] Field of Search ................... 346/76, 135.1, 76 R, 346/76 PH, 76 L; 369/94; 430/945, 270, 19, 20, 21, 494, 271

[56] References Cited

U.S. PATENT DOCUMENTS 4,396,704  8/1983  Taylor ........................... 430/325 X
4,565,770  1/1986  Held ............................... 430/325 X

OTHER PUBLICATIONS

Gazard, M. et al, "Electrode with a Film of Electrochromic Polymer Useful in Display Devices or for Energy Storage", Fr. Demande FR 2,527,843, printed Dec. 2, 1983. Abstract only. Chemical Abstracts, vol. 100, 1984, No. 164289k.
Gazard, M. et al, "Electrooptical Properties of Thin Films on Polyheterocycles". *J. Phys., Colloq.*, 1983 (c3, Conf. Int. Phys. Chim. Polym. Conduct., 1982) pp. 537–542. Abstract only. Chemical Abstracts, vol. 100, 1984, No. 42949e.
Lin, J. W. P. et al, "Synthesis and Properties of Poly(2,5-Thienylene)," *Journal of Polymeric Science*, Polym. Chem. Ed., 1980, vol. 18, No. 9, pp. 2869–2873. Abstract only. Chemical Abstracts, vol. 94, 1981, No. 4329c.
Inganaes, Olle et al, "A Photoelectrochromic Memory and Display Device Based on Conducting Polymers", *Journal of the Electrochemical Society*, 1984, vol. 131, No. 5, pp. 1129–1132. Abstract only. Chemical Abstracts, vol. 100, 1984, No. 200830r.
Gazard, M. "Electrochemically Polymerized Heterocycles as Electrochromic Materials; Proc. SPIE–Int. Soc. Opt. Eng. 1983, 400 (New Opt. Mater.) pp. 171–175. Abstract only. Chemical Abstracts, vol. 99, 1983, No. 203510h.

*Primary Examiner*—Paul R. Michl
*Assistant Examiner*—Cynthia Hamilton
*Attorney, Agent, or Firm*—Wenderoth, Lind & Ponack

[57] ABSTRACT

The present invention provides a recording medium employing conductive polymers and a recording method employing the recording medium. The recording medium of the present invention is comprised of a substrate and a conductive polymer layer including a dopant therein and layered on the substrate. In addition, the recording method according to the present invention is effected on the basis of selective change in the amount of the dopant contained in the conductive polymers. The recording medium according to the present invention is utilizable ion the field of recording, memory and electronic devices, while displaying remarkably advantageous recording characteristics and environmental stability.

8 Claims, 8 Drawing Sheets

RECORDING MEDIA AND RECORDING METHODS

BACKGROUND OF THE INVENTION

1. Field of the Invention

The present invention relates to recording media to be used in the field of recording, memory and electronic devices, and recording methods employing the recording media.

2. Description of the Prior Art

Recently, such an optical recording medium that is covered with a thin film made of tellurium thin film or squalilium dying thin film dyestuff on the substrate or the basic substance thereof has been proposed in A Milch et. al., J. Electrochem. Soc., 127, 884 (1980) and D. J. Gravesteijin et al., SPIE, 420, 186 (1983), for a trial use in a high density recording by the use of a laser beam. However, these recording media or the records effected by these recording media are not always satisfactorily stable in environments. Moreover, the deterioration in recording characteristics resulting from difficulties in the formation of a homogenous or uniform film or the difficulties in erasing of the records have been questioned. Therefore, in order to improve the above-described disadvantages, it has been proposed on the other hand to combine the recording media with a high polymer or the like, which however brings about elements not directly related to recording in a snarl or renders the principle of recording more complicated, thereby giving rise to unfavorable phenomena such as an increase of energy required for recording or the deterioration of response speed.

SUMMARY OF THE INVENTION

Accordingly, an essential object of the present invention is to provide improved recording media which show superior recording characteristics and high environmental stability by employing a layer of conductive polymer including a dopant in its recording factors, and also recording methods employing the recording media.

The recording media according to the present invention are comprised of a layer of conductive polymer including a dopant on the substrate. In this case, when the dopant is anion (or cation), the above layer of conductive polymer including anion (or cation) may be further layered with a layer of an electron donor (or an electron acceptor) such that the recording media can display high effectiveness in erasing of the records, etc.

Further, the recording methods according to the present invention are characterized in that the amount of dopant contained in the conductive polymer layer on the substrate can be selectively changed, with both conductivity and optical characteristics of the above conductive polymer layer being changed from those in the circumference thereof, such that the difference in the conductivity and the optical characteristics between the above conductive polymer layer and the circumference thereof be detected. For such methods, there are, for example, a thermal method, a chemical method, a mechanical method and and electro-chemical method, etc.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

The present invention will become more apparent from the following description taken in conjunction with one preferred embodiment thereof wherein an optical recording is performed in the manner that a layer of conductive polymer including a dopant is selectively heated by a laser beam to change the amount of the dopant contained in the above layer of conductive polymer, thereby optical characteristics of the layer of conductive polymer are detected. Hereinafter, it will be described with respect to two separate cases where the recording layer is comprised of a conductive polymer layer only, and where the recording layer is a composite layer comprised of a conductive polymer layer and an electron donor (or electron acceptor) layer. In the latter case, the electron donor (or the electron acceptor) layer is employed when the dopant is anion (or cation).

Figure 1:
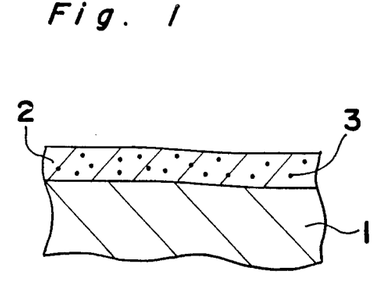
FIGS. 1–4, 6–11, 15, 17–23, 26 and 27 are respectively a longitudinal cross sectional view of an optical recording medium according to the respective embodiment of the present invention.
Figure 2:
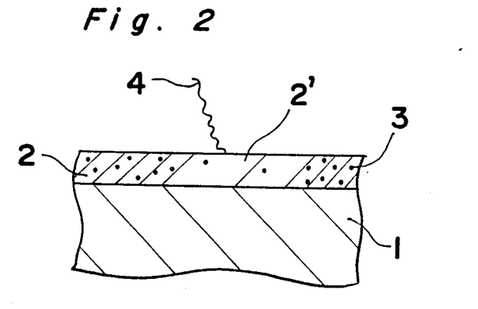

(1) With respect to the case where the recording layer is comprised of a conductive polymer layer alone:

Referring to FIG. 1, showing a longitudinal cross sectional view of an optical recording medium according to the present invention, the optical recording medium is comprised of a substrate 1 and a layer of conductive polymer 2 layered on the substrate 1, with a dopant 3 included in the layer 2 of conductive polymer. FIG. 2 illustrates the principle of recording by the use of the optical recording medium of FIG. 1.

(i) The light energy from a laser beam 4 is irradiated against and absorbed by the layer 2 of conductive polymer, and the thus-irradiated portion 2' of the layer 2 is locally heated;

(ii) A part of the energy obtained in step (i) is converted into kinetic energy for the dopant 3, such that the dopant 3 is moved outwards or to the periphery of the portion 2';

(iii) As a result, the distribution density of the dopant 3 at the portion 2' of the conductive polymer layer irradiated by the laser beam 4 is relatively lowered in comparison with the other peripheral portion thereof which is not irradiated by the laser beam 4.

Since the difference in the distribution density of the dopant 3 caused in the foregoing process is optically detectable, it is clear that the difference can be recorded by heat mode. It is generally well-known that not only the conductivity but also the other physical characteristics of the conductive polymer which consists of the layer 2 of conductive polymer are drastically changed in accordance with the presence or absence of the dopant 3 therein.

The present embodiment utilizes, among the changes caused by the presence or absence of the dopant, such changes of chemical characteristics as light reflectivity and light absorption coefficient.

The dopant 3 is generally a chemical atom or a compound of low molecules or an ion thereof. The process of recording is only accompanied with movement of the dopant 3, and accordingly, recording can be accomplished with small energy at high response speed. Further, since the layer 2 of conductive polymer displays a superior homogeneity or uniformity and an efficient environmental stability which are common characteristics of high polymers, a good recording can be maintained with high stability.

Figure 3:
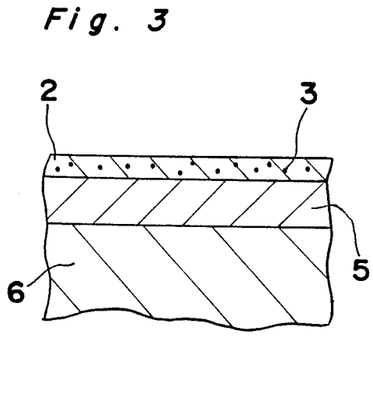

Through suitable selection of the substrate 1, the optical recording medium of the present invention can be added with various effects. More specifically, as shown in FIG. 3, when material of a light reflective characteristic such as aluminum, chromium, palladium or gold, is employed for the substrate, it becomes possible to detect signals through the light reflected from the above material. FIG. 3 shows a substrate 5 of a light reflective characteristic supported by a supporter member 6.

Figure 4:
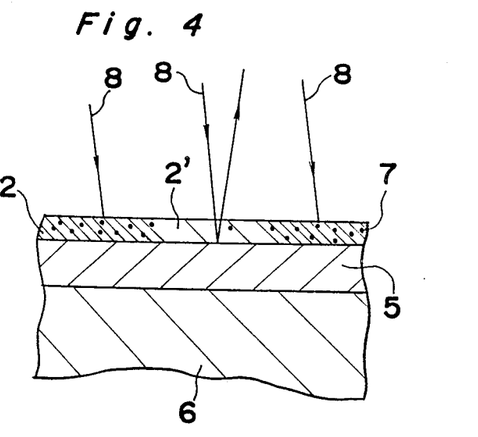
Figure 5:
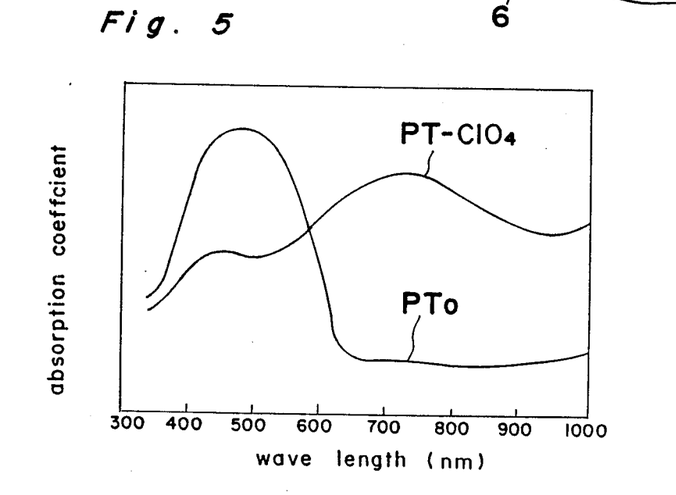
FIGS. 5 and 16 are graphs respectively showing the relationship between absorption coefficient and wavelength of polythienylene and polyacetylene in correspondence with the presence and absence of the dopant.

Referring now to FIG. 4, there is illustrated the principle of detection of the recorded portion 2' (the portion irradiated by the laser beam) in the case where polythienylene is used as the material for the layer 2 of conductive polymer. The dopant in this case is a perchlorate ion 7. The recorded portion 2' is the portion irradiated by the laser beam, where the distribution density of perchlorate ion 7 is relatively low in comparison with that of the periphery thereof. As shown in FIG. 5, the absorption coefficient of polythienylene (PTo) not including the dopant is, with respect to the light of a wavelength longer than 600 nm, smaller than that of polythienylene including perchlorate ion 7 (PT-ClO$_4$), while it is greater, with respect to the light of a wavelength shorter than 600 nm, than the polythienylene including perchlorate ion 7. Therefore, light 8 having the wavelength longer than 600 nm is passed through the recorded portion 2' to be reflected by the substrate 5, thereby being detected by a detector.

In contrast with the above, the light reflected from the portion other than the recorded portion 2' has smaller strength. This relationship is reversed in the case of the light having the wavelength shorter than 600 nm. Particularly, He-Ne laser, Ar laser and semiconductive laser, etc. having the wavelength longer than 600 nm have been effectively utilized for the laser beams so as to obtain a high reflectivity for detection of the recorded portion 2'. It is to be noted that the energy of the laser beam for the detection is normally considerably smaller than the energy consumed in recording.

Figure 6:
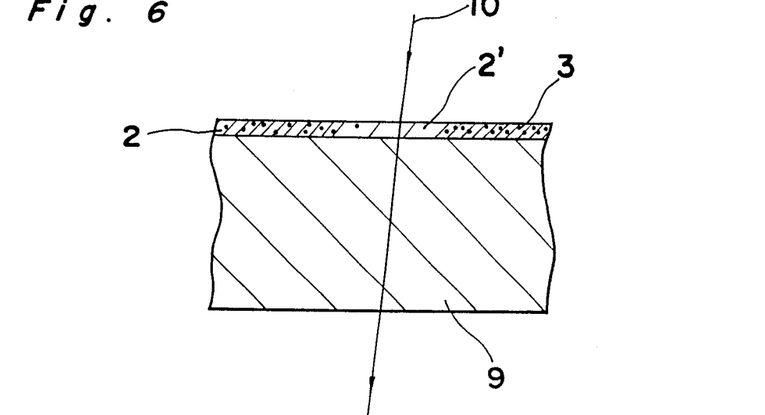

On the other hand, as shown in FIG. 6, when a substrate 9 is made of such light-permeable material as glass, polymethylmethacrylate, polycarbonate or polystyrene, light 10 is able to pass through the substrate 9 thereby to detect the recorded portion 2' in the layer 2 of conductive polymer.

Further, in the case where such conductive material as metal, or indium oxide-tin is employed for the substrate, effects peculiarly owing to the conductivity of the substrate can be obtained. In other words, such heterocyclic compounds as thiophene, 3-methylthiophene, furan, pyrrole and indole, or such aromatic hydrocarbons as benzene and azulene readily bring about a uniform layer of conductive polymer on the conductive substrate through electrolytic oxidation, with the conductive substrate as an anode. Particularly, heterocyclic compound polymers such as polythienylene or polypyrrole which is obtained from the heterocyclic compounds occupy a dominant position because of their environmental stability and good contrast of recording based on the remarkable difference of spectrums in correspondence with the presence and absence of the dopant shown in FIG. 5. It is to be noted here that in the case where the conductive substrate is made of a light-reflective material or a light-permeable material, the respective effects corresponding to the material can be made use of. It is also to be noted that the conductive substrate may be supported by the supporter member 6.

Figure 7:
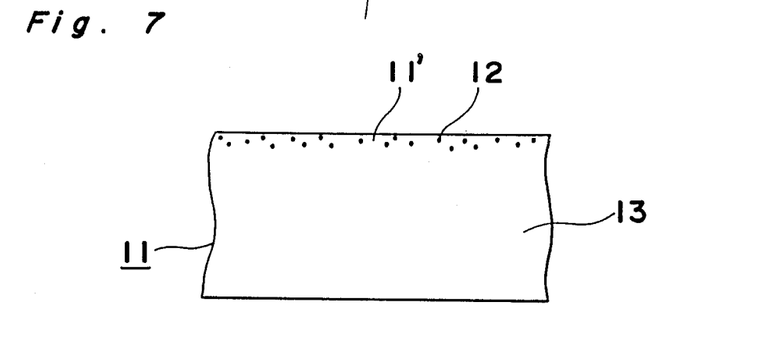

As shown in FIG. 7, for example, a surface layer 11' of polyphenylene sulfide film 11 may be doped with 5-arsenic fluoride 12, which is included within the scope of the present invention. In this case, the surface layer 11' of polyphenylene sulfide film 11 is regarded as the layer 2 of conductive polymer including the dopant, while a transparent or a semi-transparent portion 13 not including the dopant 3 is regarded as the substrate 1.

Figure 8:
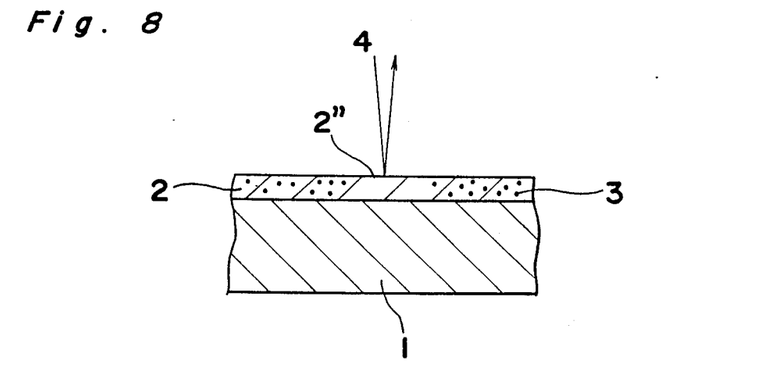

Further, such recording as is shown in FIG. 8 is possible that is carried out by utilizing the difference in reflectivity of the laser beam 4 resulting from the difference in distribution density of the dopant 3 in a surface layer 2'' of the conductive polymer layer 2.

In addition, means to selectively heat the layer of conductive polymer including the dopant is not restricted to the laser beam, but a thermal head may be effectively utilizable.

(2) With respect to the case where the recording layer is a composite layer of a conductive polymer layer and an electron donor (or electron acceptor) layer:

In this case, the recording process is completed after an anion dopant (or a cation dopant) included in the layer of conductive polymer is moved to the electron donor (or electron acceptor) layer. When the recorded portion is further heated by a laser beam different from that used at the time of recording, the dopant is returned to the layer of conductive polymer, thereby erasing the record. The erasing of the record depends on the conditions of heating by the laser beam or the materials of the conductive polymer layer and the electron donor (or electron acceptor) layer.

Figure 9:
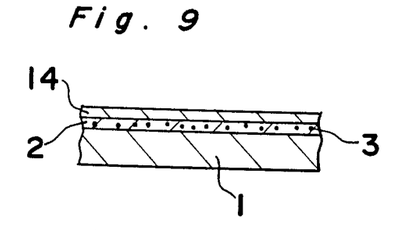
Figure 10:
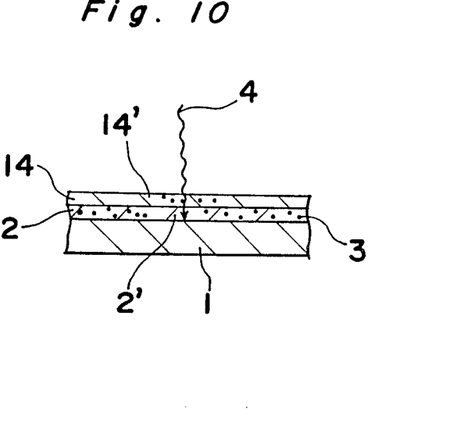

FIGS. 9 and 10 are, respectively, a cross sectional view of an optical recording medium according to one preferred embodiment of the present invention, and a cross sectional view of the optical recording medium showing the details of recording by the laser beam. Referring to the same drawings, the layer 2 of conductive polymer including the dopant 3 is formed on the substrate 1. An electron donor layer 14 is provided on the layer 2 of conductive polymer. Although anion is employed for the dopant 3 in this embodiment, an electron acceptor layer in place of the electron donor layer 14 should be formed when cation is used for the dopant 3.

Figure 11:
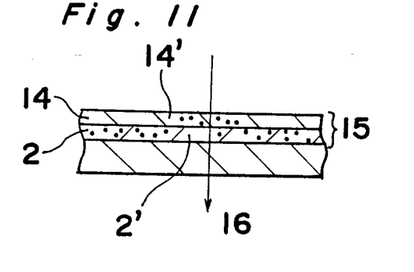

Hereinafter, the following description will be directed to the case where the dopant 3 is anion. As shown in FIG. 10, when the conductive polymer layer 2 layered on the substrate 1 is irradiated by the laser beam 4, the irradiated portion 2' is heated such that the anion dopant 3 included in the conductive polymer layer obtains kinetic energy to move to a portion 14' in the electron donor layer 14 opposite to the irradiated portion 2'. In this case, for example, if components of the conductive polymer layer 2 and the electron donor layer 14 have such a characteristic that they become transparent when they are undoped of the anion dopant 3 or doped with the anion dopant 3, respectively, a composite layer 15 consisting of the conductive polymer layer 2 and the electron donor layer 14 layered one by one as shown in FIG. 11 increases its transmittance with respect to the laser beam such that the irradiated portions 2' and 14' can be detected as recorded portions by a light 16 passing through the composite layer 15.

In general, the anion dopant 3 is an atom or a compound of low molecules or its ion. Since the recording process is only accompanied with movement of the anion dopant 3, recording can be realized with small energy at high response speed. Moreover, the conductive polymer layer 2 has superior homogeneity or uniformity and environmental stability which are general characteristics of high polymers, and therefore, good recording efficiency can be stably established.

In connection with the above, the present invention will be described in more detail with reference to the cases where the anion dopant 3 is subjected to irreversible metamorphosis in the electron donor layer 14 and where the anion dopant 3 is not subjected to metamorphosis, but is merely fixed in the electron donor layer 14, separately from each other.

Figure 12:
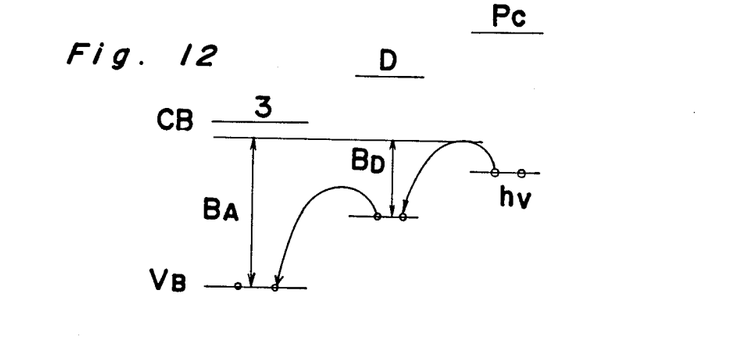
FIGS. 12 and 13 are diagrams respectively showing the energy level referenced among the conductive polymer, electron donor and dopant.

(a) With respect to the case where the anion dopant is subjected to irreversible metamorphosis:

FIG. 12 shows changes of the electronic state in the recording process. Lateral lines of FIG. 12 represent the level of a valence band (VB) and a conduction band (CB). Conductive polymers consisting of the conductive polymer layer 2 are indicated by Pc, and electron donors consisting of the electron donor layer 14 are indicated by D. The anion dopant 3, after being irradiated by the laser beam 4, is moved from the conductive polymer layer 2 to the electron donor layer 14. Subsequent to this movement of the anion dopant 3, a hole hr is moved from the conductive polymer Pc to the electron donor D further to the anion dopant 3 as shown in FIG. 12. As a result, a molecular chain Pc+ of the conductive polymer which is partially charged with plus charge is neutralized to be Pc°. Thus, the anion dopant 3 is decomposed and discharged out of the series of optical recording media (for example, in the case of $SO_4^{2-}$ ion, the anion dopant is decomposed into $SO_3$ and $O_2$ gas).

Since the conductive polymer Pc is easily undoped owing to the smooth movement of the hole hr as described above, the energy required for recording is small. In other words, it is clear that the energy BD required for recording is smaller than an energy BA which is required for recording without the electron donor D.

(b) With respect to the case where the anion dopant is not subjected to metamorphosis:

When components consisting of the electron donor layer 14 are Lewis base, the components form a stable medium together with the anion dopant 3, and therefore, the anion dopant 3 is not subjected to metamorphosis. In this case, when the anion dopant 3 is irradiated by the laser beam 4 again, it is returned to the conductive polymer layer 2, and accordingly, the record can be erased.

The relationship of ionization potential between the conductive polymers Pc consisting of the conductive polymer layer 2, and the electron donors D consisting of the electron donor layer 14, is an important factor in effectively utilizing the optical recording medium according to the present invention.

Figure 13:
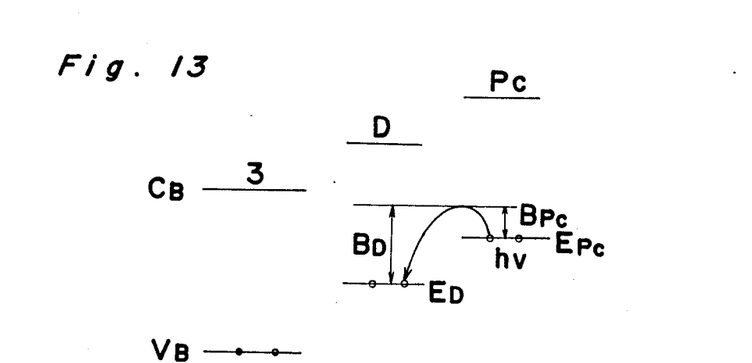

FIG. 13 shows an energy reference level of electrons of the conductive polymers Pc and the electron donors D. The difference in the ionization potential between the conductive polymers Pc and the electron donors D is represented by the difference between the energy reference levels Epc and ED of the valence band. The holes hr are distributed into the respective valence band of the conductive polymers Pc and the electron donors D in correspondence with the above difference of the ionization potential and the temperatures. When the energy of the laser beam 4 is changed in the recording process from that in the record-erasing process, the generated amount of heat is changed in accordance with the change of energies, with the temperatures in the irradiation of the laser beam 4 against the composite layer 15 also being changed. Therefore, the distribution of the holes hr, namely, the anion dopant 3 is different in the conductive polymers Pc from in the electron donors D, thereby determining the two different optical characteristics of the composite thin film 15.

More specifically, supposing that the temperature reached by the irradiation of the laser beam 4 is represented by T, with the density of holes hr, that is, the density of the anion dopant contained in the conductive polymers Pc and the electron donors D being respectively represented by $C_{pc}$ and $C_D$, the following equations are established:

$$C_{pc}(T) + C_D(T) = \text{(constant)} \quad (1)$$

$$C_{pc}(T) = C_D(T)\exp\left(-\frac{E_{pc} - E_D}{kT}\right) \quad E_{pc} \cdot E_D < 0 \quad (2)$$

according to which equations holes hr and the anion dopant 3 are distributed. Therefore, supporting that the temperatures obtained in the recording process and in the record-erasing process are respectively represented by $T_R$ and $T_E$, the density of the anion dopant 3 in the conductive polymer layer 2 is $C_{pc}(T_R)$ after the recording process or $C_{pc}(T_E)$ after the record-erasing process. Therefore, if the electron donor layer 14 is beforehand arranged to contain the anion dopant 3 in accordance with $C_D(T_E)$, the anion dopant 3 can be fully reversible moved between the conductive polymer layer 2 and the electron donor layer 14.

It it to be noted here that when the optical recording medium of the present invention is to be reversed at room temperatures or under normal conditions corresponding to the room temperatures, the recorded portion and the record-erased portion of the recording medium are almost completely fixed owing to the presence of an energy barrier $B_{pc}$ or $B_D$, and therefore, the alternate movement of the anion dopant 3 between the conductive polymer layer 2 and the electron donor layer 14 may be negligible.

Further, it will be seen from FIG. 13 that although the electronic state of the electron donor D is changed in the recording process, the anion dopant 3 is not changed. It is generally recognized that the ionization potential of the electron donor D is much smaller than that of the anion dopant 3, and accordingly, the energy required for recording can be reduced.

Moreover, when the layer 14 of electron donors is composed of conductive polymers, the anion dopant 3 can be speedily moved between the electron donor layer 14 and the conductive polymer layer 2. Thus, the optical recording medium of the present invention having the construction as described above is highly useful.

Figure 14:
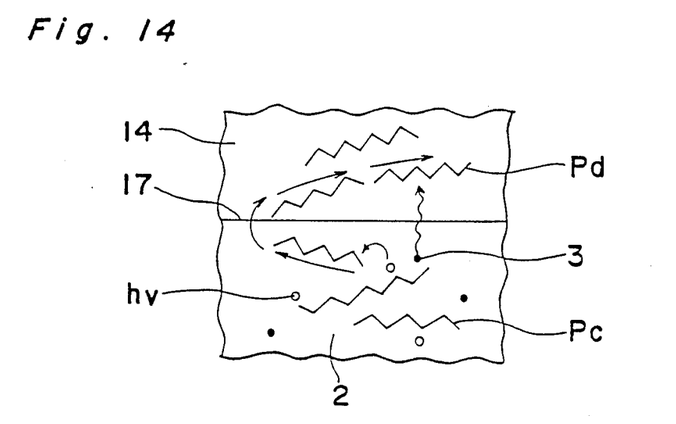
FIG. 14 is a diagram showing the state where dopants and holes move between two kinds of conductive polymers in the optical recording medium according to the present invention.

This effect will be explained with particular reference to FIG. 14. FIG. 14 illustrates diagrammatically the manner of how the anion dopant 3, when the conductive polymer layer 2 is irradiated by the laser beam 4, moves from the conductive polymers Pc, composing the conductive polymer layer 2, to the conductive polymers Pd, composing the electron layer 14. In accordance with the movement of the anion dopant 3 as illustrated in FIG. 14, the holes hr are smoothly moved in a direction shown by an arrow along the molecular chains (shown by zigzag lines in the drawing) of the conductive polymers Pc and Pd, thus completing the recording process. As shown in FIG. 14, both the anion dopant 3 and the holes hr are not always merely moved from a molecular chain of the conductive polymer Pc to a molecular chain of the conductive polymer Pd adjacent to the conductive polymer Pc. Namely, both the anion dopant 3 and the holes hr can be speedily moved between a pair of molecular chains spaced from each other by boundaries 17 composed of the conductive polymer layer 2 and the electron donor layer 14, which will bring about such an effect as, for example, an improvement of response in the recording. It is particularly advantageous to form the conductive polymer layer 2 and the electron donor layer 14 into the configuration of a thin film since the moving distance of the anion dopant 3 can be made extremely small thereby.

Meanwhile, the selection of the substrate 1 is also an important factor. In other words, when the ionization potential of the components comprising the substrate 1 is greater than that of the components comprising the conductive polymer layer 2 and the electron donor layer 14, since the anion dopant 3 is not moved to the substrate 1 even by the irradiation of the laser beam 4, recording and record-erasing can be repeatedly conducted many times.

Hereinbelow, an actual recording process will be described, in the case where the conductive polymer layer 2 and the electron donor layer 14 are comprised of polyacetylene and polythienylene, respectively.

Referring to FIG. 1, the conductive polymer layer 2 and the electron donor layer 14 are comprised of a layer of polyacetylene having the thickness of 1000 Å and polythienylene having the thickness of 1000 Å, respectively, while $ClO_4^-$ ion 3a is used as the dopant. The transmittance of the optical recording medium was measured by an argon laser beam having the wavelength of 647 nm and strength of 0.5 mW to be 40% at the initial stage of the irradiation of the argon laser beam. The aforementioned heating by the laser beam did not substantially contribute to undoping of polyacetylene. Thereafter, the optical recording medium was irradiated for 100 ns by an argon laser beam having the strength of 5 mW and the diameter of 1 micrometer, and the transmittance of the optical recording medium was again measured by the initial laser beam to be found 10%. Subsequently, the optical recording medium was further irradiated for 100 ns by an argon laser beam of 1 Mw strength and 1 micrometer diameter having the same wavelength as above, and the transmittance was measured to be 35%. It will be assumed that the transmittance at the initial stage of the irradiation (40%) was higher than that at the final stage of the irradiation (35%) because a part of the $ClO_4^-$ ion once doped with polythienylene was not fully returned to polyacethylene in the record-erasing process and still remained in polythienylene.

Figure 15:
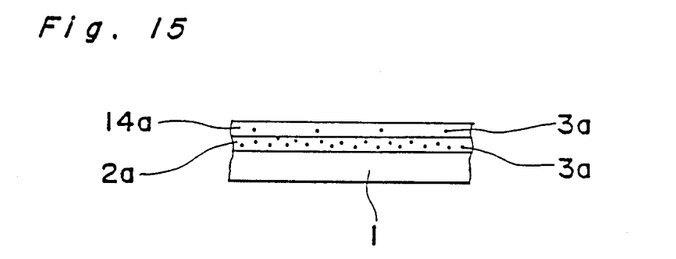

However, as shown in FIG. 15, if polythienylene thin film 14a which had been doped slightly with $ClO_4^-$ ion 3a before the first recording process was employed as an electron donor layer on the polyacethylene thin film 2a doped with $ClO_4^-$ ion 3a, the transmittance measured at the initial stage of the irradiation, after the first recording process and after the first record-erasing process was respectively 35%, 10% and 35%, thereby the complete reversible movement of the dopant being realized.

Figure 16:
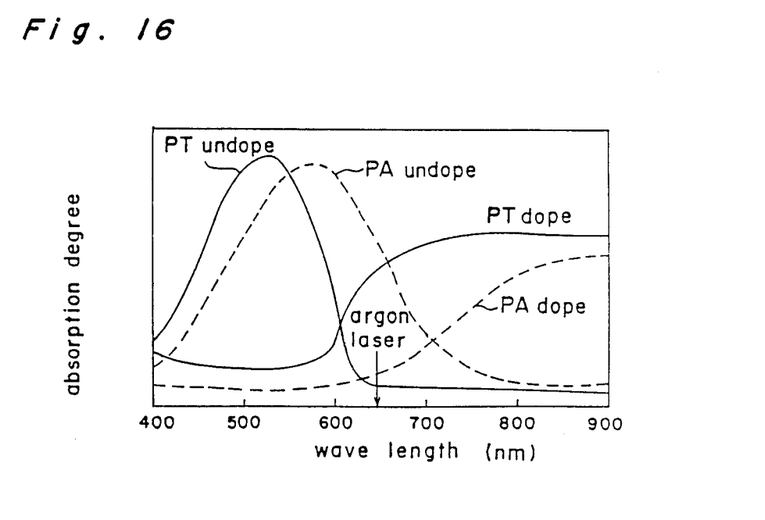

In the present embodiment, since the respective transmittances of the polyacetylene thin film and the polythienylene thin film are decreased in accordance with undoping of polyacetylene (PA) and doping of polythienylene (PT) in the recording process, it becomes possible to obtain a high S/N ratio. A graph in FIG. 16 shows the difference in light absorption spectrums when polyacetylene and polythienylene are doped or undoped.

Optical recording media having the following structures are also included in the scope of the present invention.

Figure 17:
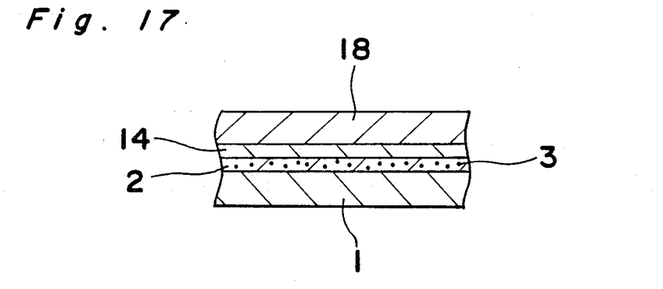

(i) Both the conductive polymer layer 2 and the electron donor layer 14 are sandwiched by two substrates 1 and 18, as shown in FIG. 17.

Figure 18:
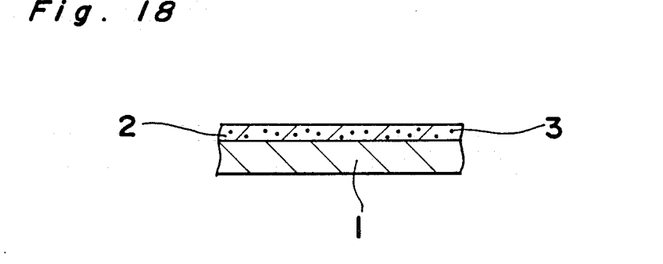

(ii) The conductive polymer layer 2 is provided on the substrate 1 which works also as an electron donor layer, as shown in FIG. 18 (or the substrate 1 may be used also as a conductive polymer layer).

Figure 19:
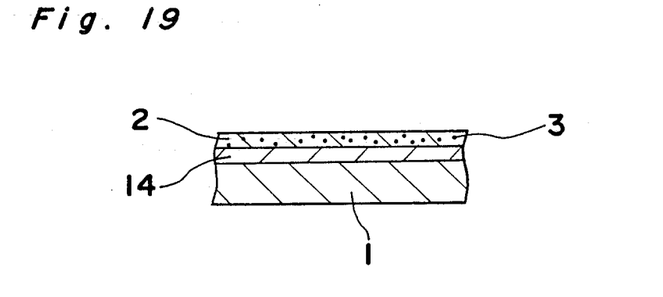

(iii) The conductive polymer layer 2 is positioned above the electron donor layer 14, as shown in FIG. 19, which is contrary to the positional relationship in FIG. 9.

Figure 20:
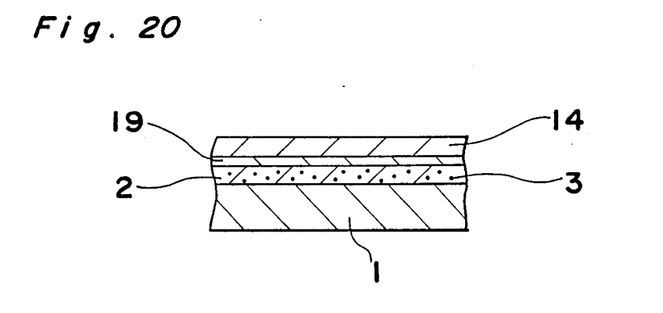

(iv) The conductive polymer layer 2 and the electron donor layer 14 have a barrier layer 19 intervened therebetween, as shown in FIG. 20.

Particularly, by arranging such construction as described in the above item (iv), the conductive polymer layer 2 or the electron donor layer 14 is able to be readily formed with the barrier layer 19 like an oxide layer, etc. on the surface thereof. This prevents the anion dopant 3 from moving alternately between the conductive polymer layer and the electron donor layer in the state except in the recording or the record-erasing process, thereby not only contributing to the environmental stability of the optical recording medium, but also rendering the optical recording medium of the present invention to be useful even when the conductive polymer layer 2 and the electron donor layer 14 are made of the same material.

The foregoing description has been directed with respect to the case where the dopant 3 is anion. However, when the dopant 3 is cation, each of the words electron donor, Lewis base, hole, ionization potential and anion dopant in the foregoing description should be changed to electron acceptor, Lewis acid, electron, electron affinity and cation dopant, respectively. Moreover, the expression "ionization potential larger than . . ." in the above description should be changed to—electron affinity smaller than . . .—.

There are alcohol, amine, polyvinylalcohol, polyurethane, polyamide and the like for and electron donor. Particularly, for a Lewis base, there are pyrazine, pteridine, purine, quinoline, acridine, 1,10-phenanthroline, phenothiazine, tetrathiotetracene, tetrathiofluvalene, etc. For an electron acceptor, carbon acid, polyacryl acid, etc. are used. Particularly, for Lewis acid, TCNQ (tetracyanoquinomethane), TCNNQ (tetracyanonaphoquinodimethane), TCNAQ (tetracyanoanthraquinodimethane) and their derivatives, tetracyanolthylene, p-chloranil, trinitrobenzene, 2,4,7-trinitrofluorenone, 1,3,6,8-tetracyanopyrene, etc. are used.

In addition, materials or compounds comprising the substrate are as follows: metals such as gold, platinum or palladium, oxides mainly such as zinc oxide, titanium oxide, indium oxide, tin oxide and silicon oxide, fluoric polymers such as polyvinylidene fluoride, polytetrafluoroethylene and ethylene, hydrocarbonic polymers such as poly(p-xylylene) and polyethylene, and silicon resins. Each of these compounds as described above has a large ionization potential and a small electron affinity.

Figure 21:
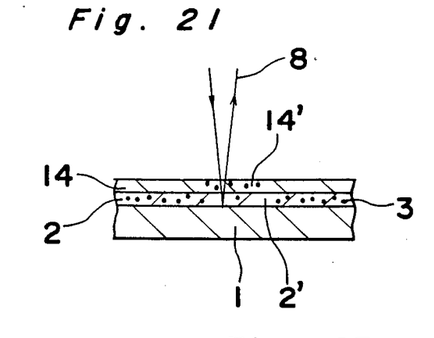
Figure 22:
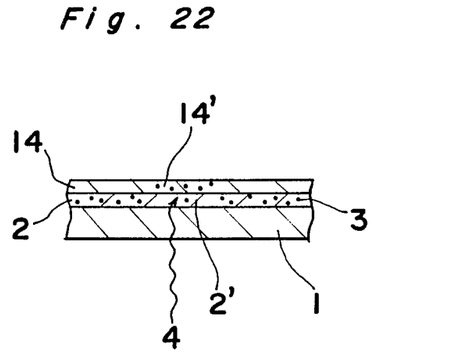
Figure 23:
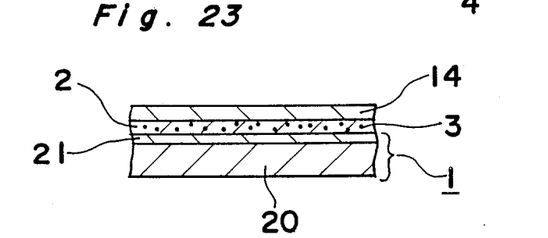

If such metal as gold or platinum is used as a material for the substrate 1, as shown in FIG. 21, the reflecting light 8 can be detected as a recording signal in the same manner as in FIG. 4. Further, when the substrate 1 is transparent, the recording process is not substantially changed even by the irradiation of the laser beam 4 from the reverse direction to that of FIG. 10, which will be seen from FIG. 22. In addition, as shown in FIG. 23, the substrate 1 may be composed of, for example, a supporter member 20 made of glass or the like and a metal thin film 21 spattered with gold or the like.

Conductive polymers and dopants which can be used commonly both in the case where the recording layer is composed of a conductive polymer layer alone and in the case where the recording layer is a composite one composed of a conductive polymer layer and an electron donor (or electron acceptor) layer will be enumerated hereinbelow.

For the conductive polymers, $\pi$-conjugated polymer compounds such as polyacetylene, polythienylene or polypyrrole, polymer compounds such as polyphenylene sulfide, polyphenylene oxide, polyvinylene sulfide or polyphenylene selenide which are formed through the combination of a $\pi$-conjugated system with ether, sulfide, selenide or telluride or polyvinyl carbazole having a $\pi$-conjugated system such as carbazole ring included in the side chains thereof are employed.

For the dopants, halogen such as iodine, compounds of low molecules or ion such as perchlorate ion, sulfate ion, fluorophosphate ion, fluoroborate ion, ammonium ion, alkali metal ion, alkaline earth metal ion, tetracyanoethylene, sulfur trioxide, chlorosulfonic acid, iron chloride, arsenic pentafluoride, arsenic trifluoride are employed.

When the conductive polymer layer and the electron donor (or electron acceptor) layer are respectively formed into the configuration of a thin film, improvement of response and other advantageous effects can be realized. The aforementioned thin film means a layer having the thickness of $1-10^4$ nm, and particularly the layer of $1-10^3$ nm thickness is most effectively used.

Recording is accomplished in the following various methods according to the present invention.

(i) Thermal Recording

This method is such that heat is converted into kinetic energy (or diffusive energy) of the dopant 3 so that the dopant 3 is moved to change the containing amount thereof in the recording layer. This method is simplest and at the same time most effective of all. Especially, when heat is generated by the irradiation of electromagnetic wave, such an advantageous effect as a quick response speed in the recording process can be achieved. Since a large amount of energy can be generated for a short period of time by the use of a xenon arc lamp, it will be suitable for recording of a large area in a short time. On the other hand, a high-density recording becomes possible by the use of a laser beam. It is to be noted that it is also possible to record effectively even by the heat through heat conduction from a heat source such as a thermal head.

(ii) Chemical Recording

This method is based on the fact that the containing amount of the dopant 3 in the recording layer is increased (doped) or decreased (undoped) by a chemical method. By way of example, if a conductive polymer which contains a small amount of the dopant is brought into selective contact with a solution or a gas including the dopant, the containing amount of the dopant at the contact area becomes higher than that in the periphery thereof, thereby recording being established. On the contrary, when a conductive polymer high in its containing amount of the dopant is employed, and the dopant is anion (or cation), the conductive polymer is brought into selective contact with reducible (or oxidizable) materials so as to lower the containing amount of the dopant, thereby effecting recording.

(iii) Mechanical Recording

This is to conduct recording by selective undoping of the conductive polymer with mechanical impacts.

(iv) Electrochemical Recording

According to this electrochemical method, the conductive polymer is selectively and reversibly doped and undoped.

The present invention will be made more clear from the following description taken in conjunction with the preferred embodiments thereof.

EMBODIMENT 1

Toluene solution made of tetrabutoxy titanium 0.1M and triethyl aluminum 0.4M was cooled by dry iced methanol and drained onto a glass substrate deposited horizontally in a vacuum glass container. Thereafter, acetylene gas was introduced into the glass container to form a thin film of polyacetylene having the thickness of approximately 5000 Å. The polyacetylene thin film was then moved into another glass container to be doped by chloro sulfate, against which thin film was irradiated by Ar laser having the wavelength of 515 nm from the side of the polyacetylene film. Then, the transmittance of light passing through the glass substrate was detected. The transmittance with the recording energy of 50, 500 mJ/cm$^2$ changed from 40% at the initial stage of the irradiation to 35% at the time of the first record-erasing. In this case, the power of the Ar laser for recording and for detection was respectively 10 mW and 1 mW.

EMBODIMENT 2

Toluene solution made of tetrabutoxy titanium 0.1M and triethyl ammonium 0.4M was cooled by dry iced methanol and drained on a glass substrate deposited horizontally in a vacuum glass container. Then, acetylene gas was entered into the glass container to produce a thin film of polyacetylene having the thickness of about 1 micrometer. Next, the thin film of polyacetylene was moved into another container to be doped by iodine, to which thin film was irradiated argon laser having the wavelength of 515 nm and the diameter of 1 micrometer from the side of the polyacetylene film. The reflectivity of the polyacetylene film before and after the irradiation was measured. With the recording energy of 50 mJ/cm$^2$, the reflectivity changed from 5% at the initial stage to 20% after recording. The power of the argon laser for recording and for detection was respectively 10 mW and 1 mW.

The change in the reflectivity corresponds to the change in the containing amount of the dopant at the very surface portion of the conductive polymers, and accordingly, recording with low energy becomes possible irrespective of the difference in the thickness of the polyacetylene film.

EMBODIMENT 3

Thiophen, 3-methylthiophen and pyrrole were electrolytically polymerized by circulation of electricity at 1 mA/cm$^2$ for 30 seconds in a solution indicated in Table 1, with a glass electrode spattered with gold being an anode, so as to form a thin film of polythienylene, poly(3-methylthienylene) and polypyrrole, respectively on the gold electrode. The above thin films were about 2000 Å in thickness. At this time, during the electrolytic polymerization, the anion portion of the support electrolytes shown in the table was taken into the thin film of conductive polymer as a dopant.

TABLE 1

| Composition of Electrolyte Solution |
| --- |
| Reaction material (Density) |
| Thiophen (0.2 M), 3-methylthiophen (0.2 M), pyrrole (0.2 M) |
| Support electrolyte |
| (Bu$_4$) N$^+$BF$_4^-$, (Bu$_4$) N$^+$ClO$_4^-$, (Bu$_4$) N$^+$PF$_6^-$ |
| Solvent |
| Nitrobenzene, Nitrobenzene, Acetonitrile |

Figure 24:
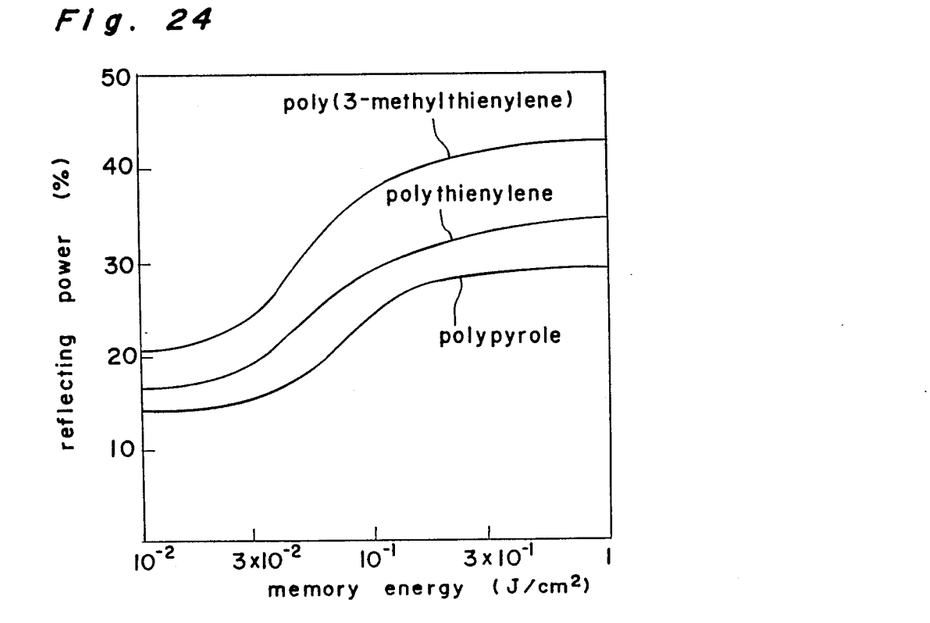
FIGS. 24 and 25 are graphs respectively showing the relationship of the reflectivity with respect to the recording energy in the recording medium of the present invention.

After each of the above thin films was irradiated by a semi-conductive laser of 830 nm wavelength from the side of the conductive polymer thin film, the reflectivity of light reflected by the gold-spattered film was measured. The change in the reflectivity with respect to the recording energy below 1 J/cm$^2$ is represented in FIG. 24. It is to be noted here that the power of the laser for recording and for detection was respectively 5 mW and 0.5 mW.

EMBODIMENT 4

In an electrolyte indicated in Table 1, with a glass electrode spattered with gold as an anode, thiophen, 3-methylthiophen and pyrrole were electrolytically polymerized by circulation of electricity at 1 mA/cm$^2$ for 20 seconds. On the gold electrode, thin films of conductive polymers each comprised of polythienylene, poly(3-methylthienylene) and polypyrrole and having the thickness of about 1500 Å were obtained. At this time, during the electrolytic polymerization, the anion portion of the support electrolyte shown in Table 2 was taken into the thin film of conductive polymer as a dopant.

TABLE 2

| Composition of Electrolyte Solution |
| --- |
| Reaction material (Density: M) |
| Thiophen (0.2), 3-methylthiophen (0.2), Pyrrole (0.2) |
| Support electrolyte (Density: M) |
| H$_2^+$SO$_4^{2-}$ (0.6), (Bu)$_4$N$^+$ClO$_4^-$ (0.02), (Bu)$_4$N$^+$PF$_6^-$(0.02) |
| Solvent |
| Diethyl sulfate, Nitrobenzene, Acetonitrile |

Each of the thin films of conductive polymers was then coated by a spinner coating with a thin film of polyvinyl alcohol having the thickness of 1 micrometer as an electron donor, and was further provided with an acryl plate of light hardening resin thereon.

Figure 25:
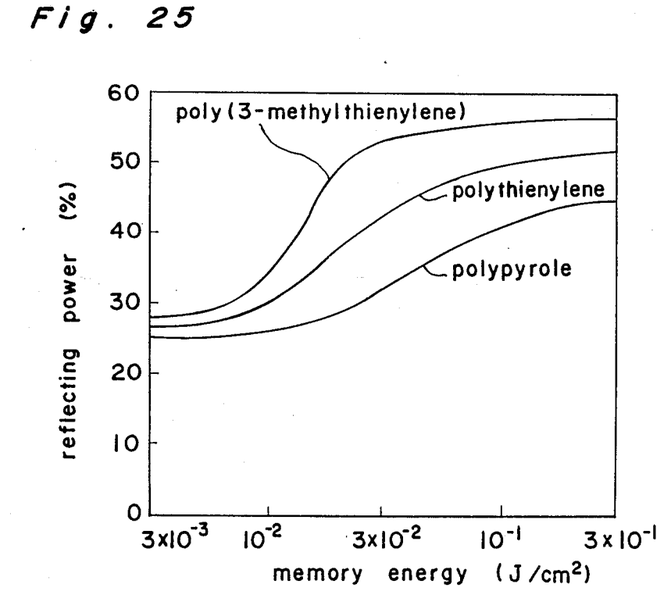

After the semi-conductive laser of 830 nm wavelength was irradiated against the above thin film from the side of the acryl plate, the reflectivity of the light reflected by the gold spattered film was measured. The change in the reflectivity with respect to the recording energy is shown in FIG. 25. In this case, the power of the laser for recording and for detection was 5 mW and 0.5 mW, respectively.

EMBODIMENT 5

Toluene solution made of tetrabutoxy titan 0.1M and triethyl alunium 0.4M was cooled by dry iced methanol, and drained on an ITO glass substrate horizontally deposited in a vacuum glass container. Subsequent to this, acetylene gas was introduced into the glass container to form a thin film of polyacetylene having the thickness of 1000 Å. The thin film of polyacetylene was taken out to another glass container for doping by perchloric acid.

On the other hand, a solution which was obtained through recirculation of polythienylene arranged in accordance with the disclosure in T. Yamamoto et al., J/Polym. Sci., Polym. Lett. Ed. 18, 9 (1890) with chlorofom was spin-coated to obtain a thin film of polythieneylene having the thickness of 1000 Å on the thin film of polyacetylene.

The ITO glass substrate wherein the polyacetylene thin film and the polythienylene thin film were layered was soaked in 0.01M solution of perchloric acid, being electrolytically doped for one minute with a current density of 10 A/cm$^2$.

The ITO glass substrate was then washed in water, to which was attached a poly(p-xylene) sheet of 0.1 mm through epitaxial polymerization of p-xylene dimer. Thus, an optical recording medium was produced.

The above optical recording medium was irradiated by an argon laser of 0.5 mW power and 1 micrometer diameter having the wavelength of 647 nm from the side of the poly(p-xylene) for 10 ns. At this time, the transmittance of light passing through the above ITO glass substrate was 35%. Then, the same argon laser of 5 mW power and 1 micrometer diameter was irradiated against the same portion as above for 100 ns, and the transmittance was measured again to be 10% (recording process). Thereafter, the same argon laser of 1 mW power and 1 micrometer diameter was irradiated again for 100 ns to the same portion, and the transmittance was found to be 35% (record-erasing process). It was confirmed that the recording and record-erasing process was reversibly accomplished more than ten times.

It is to be noted that the number of ClO₄ ion included in polyacetylene and polythienylene per one carbon atom before recording was respectively 0.1 and 0.01.

EMBODIMENT 6

Polyhexanamide of 1 micrometer in thickness was spin-coated by the polythienylene obtained in Embodiment 5 and layered with polythienylene thin film of about 2000 Å in thickness, which was then subjected to doping with iodine. Thus, an optical recording medium was obtained. By using this optical recording medium, the transmittance before and after recording was respectively measured in the same manner as in Embodiment 4. It was confirmed that the transmittance was changed from 30% to 40% by the irradiation of the laser beam corresponding to the recording energy of 50 mJ/cm².

EMBODIMENT 7

Figure 26:
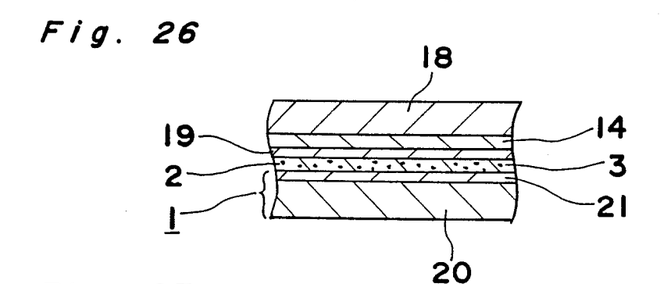

Thiophen, 3-methylthiophen and pyrrole were electrolytically polymerized on the gold-spattered electrode in the same manner as in Embodiment 4, and accordingly, polythienylene, poly(3-methylthienylene) and polypyrrole thin films were attached to the electrode. These were annealed in an oxygen gas at 50° C. for about two hours to be covered with an oxide layer on the surface thereof. Thereafter, thiophen was further electrolytically polymerized in the presence of (Bu)₄N⁺BF₄⁻, and undoped of BF₄⁻ ion through cleansing by methanol and layered with poly(p-xylene) sheet as in Embodiment 5, of which construction is as shown in FIG. 26. That is, the conductive polymer layer is formed on the substrate 1 having a metal-spattered film 21 on a glass support member 20 thereof, with the oxide layer on the surface of the conductive polymer layer being the barrier layer 19. Further, the electron donor layer 14 and the substrate 18 are layered on the barrier layer 19 one after another. Recording was carried out by employing these thin films in the same manner as in Embodiment 4, and the reflectivity before and after the irradiation of laser beam corresponding to the recording energy of 100 mJ/cm² was measured. The result is shown in Table 3.

TABLE 3

Reflectivity Change by Irradiation of Laser Beam

Conductive polymer at the first electrolytic polymerization
Polythienylene, 3-methylthienylene, Polypyrrole
Reflectivity before irradiation (%)
20, 25, 25
Reflectivity after irradiation (%)
10, 10, 15

Figure 27:
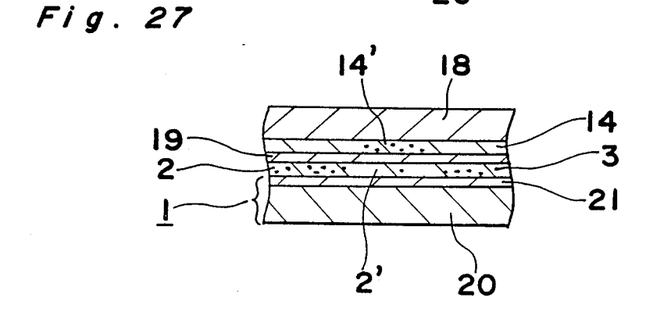

The deterioration in the reflectivity due to the irradiation of the laser beam results from the distribution difference of the anion dopant between the two layered thin films of conductive polymers. FIGS. 26 and 27 show the distribution difference of the anion dopant (according to the present embodiment, $So_2^{2-}$ ion, $ClO_4^-$ ion or $PF_6^-$ ion) distributed between the conductive polymer thin film 2 (according to the present embodiment, polythienylene, poly(3-methylthienylene) or polypyrrole thin film formed by the first electrolytic polymerization) and the electron donor thin film 14 (according to the present embodiment, polythienylene thin firm formed by the second electrolytic polymerization), before and after recording, respectively.

Figure 28:
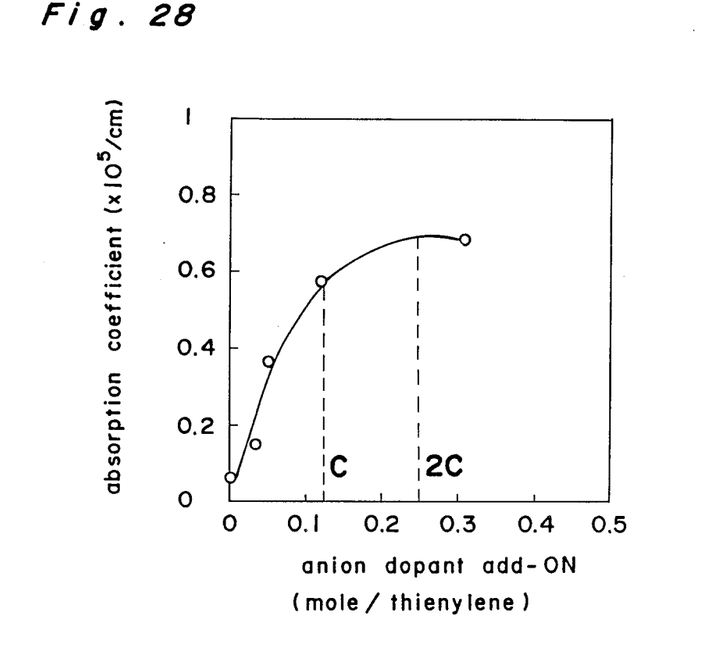
FIG. 28 is a graph showing the relationship of absorption coefficient with respect to the amount of dopant contained in polythienylene.

FIG. 28 is a graph showing the relationship between the containing amount of the anion dopant 3 and the absorption coefficient of the polythienylene thin film with respect to light of 830 nm wavelength. The relationship between the two is, as shown in FIG. 28, generally non-linear. In this case, the absorption coefficient shows a tendency to saturation with respect to the increase of the containing amount of the dopant 3. Supposing that both the conductive polymer thin film 2 and the electron donor thin film 14 are made of polythienylene, with the containing amount of the anion dopant 3 before recording being represented by 2C, and that of the conductive polymer thin film 2 and the electron donor thin film 14 after recording being repesented by C, it is found that the absorption coefficient of the recorded portion 2' and 14' (the portions irradiated by the laser beam) in the composite thin film 15 becomes larger than before recording.

Additionally, it was confirmed that even after the optical recording medium was preserved at the temperatures of 40° C. and the relative humidity of 90% for 100 days, the respective reflectivity of the recorded portion and the non-recorded portion never changed.

As is clear from the foregoing description, the present invention is applicable not only to the optical recording medium, but also to, for example, the information of fine conductive patterns as will be described later.

EMBODIMENT 8

Figure 29:
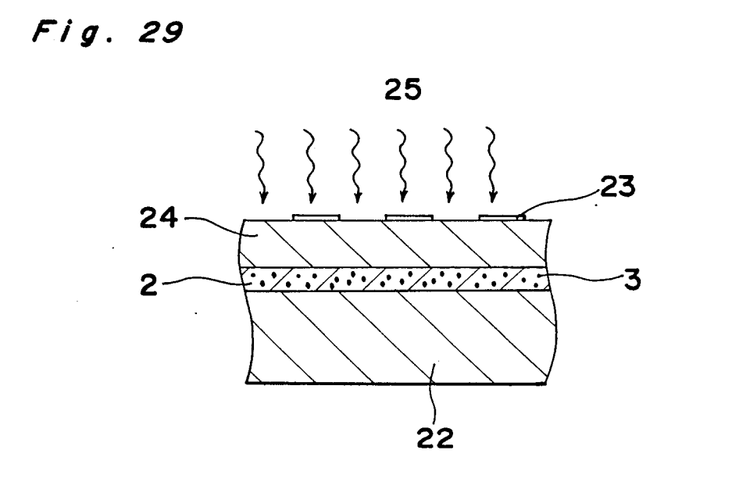
FIG. 29 is a diagram showing the state that a xenon arc lamp is irradiated against the conductive polymer to form conductive patterns.

In a solution of nitrobenzene composed of 3-methylthiophen 0.02M, with taking a glass electrode 22 of FIG. 29 which was spattered with oxide indium-tin as an anode, 3-methylthiophen was electrolytically polymerized through electric circulation at 1 mA/cm² for 30 seconds so that a thin film 2 of poly3-methylthienylene) having the thickness of about 2000 Å was formed on the glass electrode 22. The thin film 2 was closely adhered to a glass 24 parallelly patterned with chromium 23 by 1 micrometer width and 3 micrometer pitch as shown in FIG. 29 (cross sectional view). Then, the film 2 adhered to the glass 24 was irradiated by a xenon arc lamp 25 with the energy density of 1 J/cm². The transmittance at the irradiated portion and at the non-irradiated portion in the periphery of the irradiated portion was 40% and 20%, respectively. The transmittance was measured by a semi-conductive laser beam having the power of 1 mW and the wavelength of 830 nm. In addition, the conductivity of the irradiated portion was $10^{-9}$ s/cm and $10^2$ s/cm, respectively. This method enables the formation of more complicated optical patterns or conductive patterns.

EMBODIMENT 9

Polyacetylene thin film arranged in Embodiment 2 was covered with a photoresist film, layered with the glass patterned by chrome as in Embodiment 8 and irradiated by ultraviolet rays. Then the non-hardened portion below the chrome pattern was dissolved by a solvent, thereafter forming micro patterns on the photoresist film. After exposing to the vapor of trioxide sulfur, conductive patterns in which a portion corresponding to the chrome pattern which was highly conductive was formed. Then, the photoresist film was dissolved and removed. The conductivity at the irradiated portion and at the non-irradiated portion was $10^{-8}$ s/cm and $10^3$ s/m, respectively.

Conventionally, such conductive patterns as obtained in Embodiments 8 and 9 have been often disadvantageous because of the presence of the difference between the conductive portion and the non-conductive portion in the periphery like in IC circuits and printing circuit boards. However, there is found no such difference between the high conductive portion where the dopant was doped and the low conductive portion in the periphery where the dopant was not doped, as is seen from the embodiments of the present invention. Therefore, the recording methods according to the present invention are effective.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A method of recording data on a dopant-containing conductive polymer layered on a substrate by selectively changing the dopant concentration in selective areas of the conductive-polymer layer in accordance with the data to be recorded, wherein the change in dopant concentration causes a corresponding change in the optical absorption characteristics of the polymer layer, whereby the recorded data is reproduced by detecting differences in the optical absorption characteristics between said selected areas and other portions of the polymer layer after subjecting the polymer surface of the light rays, and whereby the recorded data is erased by changing the dopant distribution in the polymer layer back to the original dopant concentration, said dopant concentration being changed by means of heat.

2. A method of recording data as claimed in claim 1, in which the conductive polymer is formed in the configuration of a thin film.

3. A method of recording as claimed in claim 1, wherein said heat is generated by the irradiation of electro-magnetic waves.

4. A mwethod of recording as claimed in claim 3, wherein said electro-magnetic waves are generated from a xenon arc lamp or a laser beam.

5. A method of recording as claimed in claim 1, wherein said heat is generated through heat-conduction from a heat source.

6. A method as claimed in claim 1, wherein the substrate is transparent.

7. A method as claimed in claim 1, wherein the substrate is a light reflective material.

8. A method as claimed in claim 1, wherein the dopant is an anion or cation and an electron donor layer or an electron acceptor layer is in contact with the conductive polymer layer.

* * * * *